United States Patent
Smith

(10) Patent No.: US 6,485,028 B1
(45) Date of Patent: Nov. 26, 2002

(54) MLS GASKET WITH FLOATABLE COMBUSTION SEAL

(75) Inventor: Ray Dean Smith, New Lenox, IL (US)

(73) Assignee: Dana Corporation, Toledo, OH (US)

( * ) Notice: Subject to any disclaimer, the term of this patent is extended or adjusted under 35 U.S.C. 154(b) by 29 days.

(21) Appl. No.: 09/690,948

(22) Filed: Oct. 17, 2000

(51) Int. Cl.⁷ .............................. F02F 11/00; F16J 15/02
(52) U.S. Cl. ....................... 277/598; 277/600; 277/616; 277/630; 277/642
(58) Field of Search ................................. 277/598, 600, 277/601, 592, 609, 612, 614, 625, 616, 630, 642

(56) References Cited

U.S. PATENT DOCUMENTS

| | | | |
|---|---|---|---|
| 2,339,479 A | * | 1/1944 | McCreary |
| 2,681,241 A | * | 6/1954 | Aukers |
| 3,108,818 A | * | 10/1963 | Furstenburg |
| 3,215,442 A | * | 11/1965 | Papenguth |
| 3,565,449 A | | 2/1971 | Ascencio et al. |
| 3,811,689 A | * | 5/1974 | Farnam |
| 4,095,809 A | * | 6/1978 | Smith |
| 4,331,336 A | * | 5/1982 | Czernik et al. |
| 4,405,138 A | * | 9/1983 | Skrycki |
| 4,535,999 A | | 8/1985 | Locacius |
| 4,620,710 A | * | 11/1986 | Lambert et al. |
| 4,976,225 A | * | 12/1990 | Stang et al. ............. 123/41.74 |
| 5,039,117 A | * | 8/1991 | Gohrlich et al. |
| 5,145,190 A | * | 9/1992 | Boardman |
| 5,267,740 A | | 12/1993 | Stritzke |
| 5,671,927 A | * | 9/1997 | Schweiger |
| 5,803,465 A | * | 9/1998 | Schweiger ................. 277/593 |
| 5,895,054 A | | 4/1999 | Miyaoh et al. |
| 6,062,573 A | * | 5/2000 | Budovec et al. ............ 277/598 |
| 6,076,833 A | * | 6/2000 | Geshi ......................... 277/595 |

* cited by examiner

Primary Examiner—Anthony Knight
Assistant Examiner—Alison K. Pickard
(74) Attorney, Agent, or Firm—Rader, Fishman & Grauer PLLC

(57) ABSTRACT

An improved multi-layer gasket for an internal combustion engine comprises an inner spacer layer sandwiched between top and bottom surface layers. The inner spacer layer provides cylinder openings designed to correspond with each cylinder bore in the engine block. Channels cut in the spacer layer extend outwardly from each cylinder opening. A combustion-sealing member formed with tabs extending outwardly from the circumference of the sealing member is received into each cylinder opening and orientated with each tab residing in a channel. Each tab is embossed at its distal end and eyeletted with an eyelet to the top and bottom layers. Tabs retain the sealing member in the cylinder opening, positively locate the sealing member over the cylinder bores on the engine block during installation and permit the sealing member to float in the cylinder bore during operation of the engine independently of the spacer layer.

17 Claims, 3 Drawing Sheets

MLS GASKET WITH FLOATABLE COMBUSTION SEAL

FIELD OF THE INVENTION

The present invention relates to a cylinder head gasket for an internal combustion engine. More particularly, the invention relates to a multi-layer metal cylinder head gasket having a sealing member that floats in a cylinder opening, corresponding to a combustion chamber, of a spacer layer of the multi-layer gasket.

BACKGROUND OF THE INVENTION

Gaskets are often used as a seal between mating mechanical components. One common application involves gasket placement between the engine block and cylinder head of an internal combustion engine. Cylinder head gaskets typically extend around cylinder bores to provide a combustion seal, maintaining the high temperature gases of combustion within the cylinder bores. Simultaneously, the gaskets also seal fluid flow openings such as coolant and oil openings to prevent undesirable mixing. A cylinder head gasket bears the load from a bolted connection of the mechanical components and relies upon that load to provide both the combustion and fluid flow seals.

In a metal laminate gasket for an internal combustion engine, the gasket is formed from a plurality of metal plates laminated together. The metal plates provide structural support within the joint between the cylinder head and engine block, and provide radial strength to resist gasket blow-out due to pressure from the combustion chamber.

Known gaskets use any of several types of combustion seals. One type, known as a flanged combustion seal ring, is essentially comprised of a wire, having a generally circular cross-sectional area. The wire may be inserted within an open end of a U-shaped flange with opposing legs of the flange engaging opposite faces of a main gasket body about the combustion opening. A clamping load is applied to the flanged portion of the gasket at the point of contact, deforming the ring's circumference to seal out combustion gases. Using such a configuration, the clamping load required to seal against combustion gases is typically higher because the force is distributed between two rings and may tend to promote undesirable gasket and engine-block distortion.

Another type of combustion seal relies on a floating yieldable ring installed separately from the gasket. The floating ring is installed within a channel formed about the combustion chamber hole. A force applied to such a ring is concentrated at the point of contact, deforming the ring's circumference to effectively seal out combustion gases. However, such a seal ring must be separately installed, and may migrate prior to being subject to a clamping load, resulting in an imperfect seal. Further, the channel receiving the ring must be separately machined in the engine block to accommodate the ring, complicating gasket manufacture.

SUMMARY OF THE INVENTION

The present invention is directed to a cylinder head gasket of an internal combustion engine having at least one cylinder bore opening. The gasket is clamped between a cylinder head and an engine block to sealingly engage a mating surface on the cylinder head and engine block.

The gasket is a multi-layer metal gasket adapted to cooperate between an engine block and an engine head comprising an inner spacer layer sandwiched between top and bottom surface layers. The inner spacer layer provides cylinder openings designed to correspond and sealingly engage with each cylinder bore in the engine block. At least one channel, cut in the spacer layer, extend outwardly from a periphery defined by the circumference of each cylinder opening.

A combustion sealing member formed with at least one tab extending outwardly from a periphery defined by the circumference of the sealing member is received into each cylinder opening. The sealing members orient in the cylinder opening with the tab residing in a channel. The tab is embossed at its distal end. Upon positioning in the cylinder opening, the tab is eyeletted with an eyelet to the top and bottom layers. The tabs retain the sealing member in the cylinder opening, positively locating the sealing member over the cylinder bores on the engine block during installation and permitting the sealing member to float in the cylinder opening during operation of the engine independently of the spacer layer.

The tabs projecting outwards from the sealing members and the channels cut outwards from the periphery of the cylinder openings of the inner spacer layer that receive the tabs over come known problems in gasket design. First, the channels by receiving the tabs connected to the upper and lower surface layers insure proper alignment of the sealing member over the cylinder bore during installation of the gasket. Additionally, once installed, the tabs permit the sealing member to float in the cylinder opening independent of the inner spacer layer to flexibly adapt to engine movements during operations. This flexibility of the floating sealing member increases the effectiveness of the seal of the gasket about the cylinder bores.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
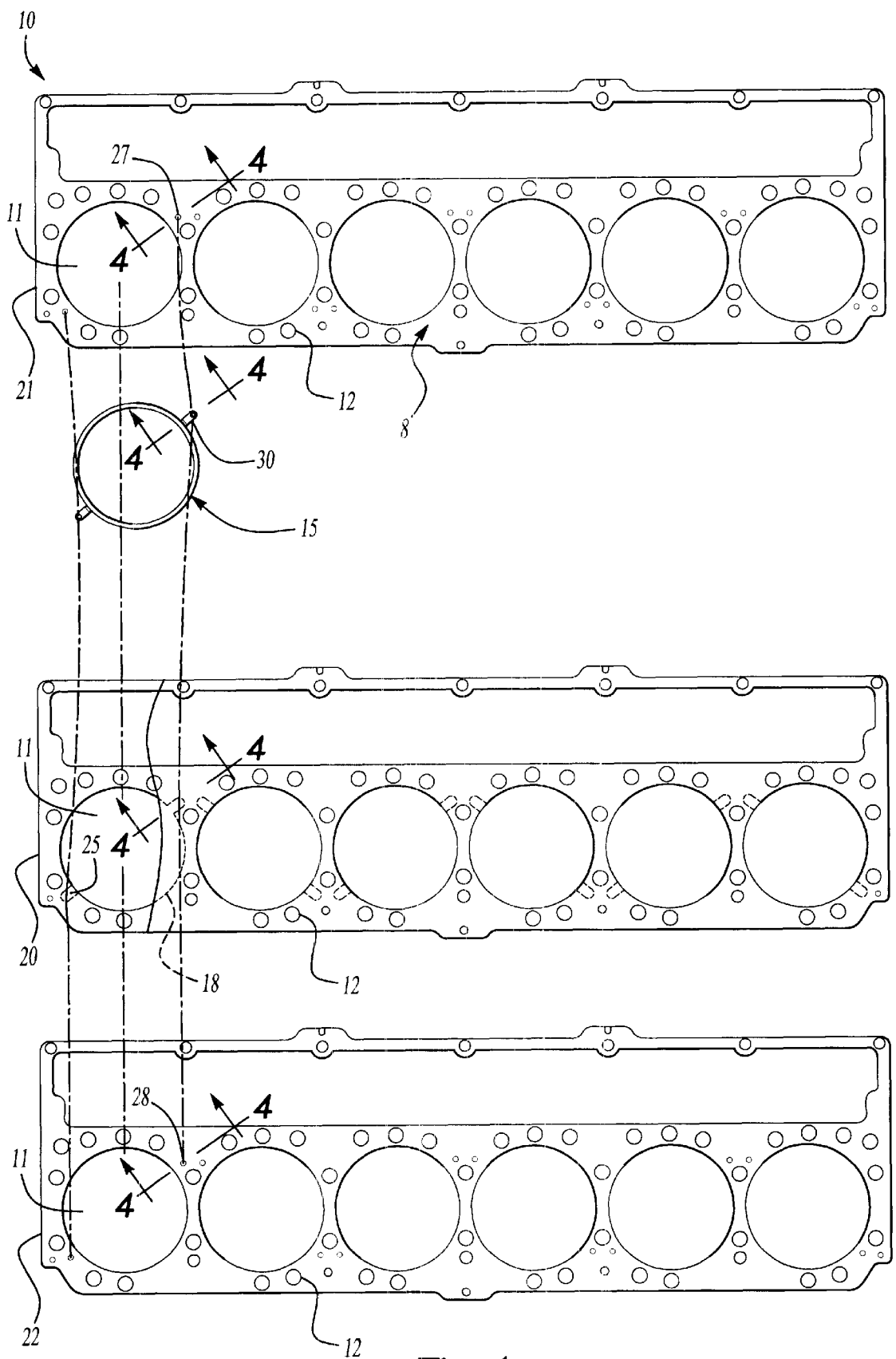
FIG. 1 is an assembly view of the sealing assembly and gasket of the present invention.

A sealing assembly of cylinder head gasket 10 is shown in FIG. 1 in an expanded assembled state. As shown in FIG. 1, the gasket 10 includes at least one combustion chamber or cylinder bore openings 11 in combination with bolt bores 12. To seal the cylinder bore of an internal combustion engine (not shown), gasket 10 supports at least one circular sealing members 15 designed to reside and float in each cylinder bore opening 11.

Gasket 10 comprises at least one inner spacer layer 20 and at least one upper surface layer 21 and at least one lower surface layer 22 that are disposed on opposing sides of inner spacer layer 20. Layer 21 is attached to an upper surface of inner spacer layer 20, while layer 22 is attached to a lower surface of inner spacer layer 20, effectively sandwiching inner spacer layer 20 between upper and lower spacer layers 21 and 22. Cylinder opening 11 and bolt bores 12 in inner surface layer 20 align with corresponding cylinder openings 11 and bolt bores 12 in surface layers 21 and 22 when inner spacer layer 20 is sandwiched between surface layers 21 and 22 in an assembled configuration for installation between the cylinder head and engine block.

Figure 3:
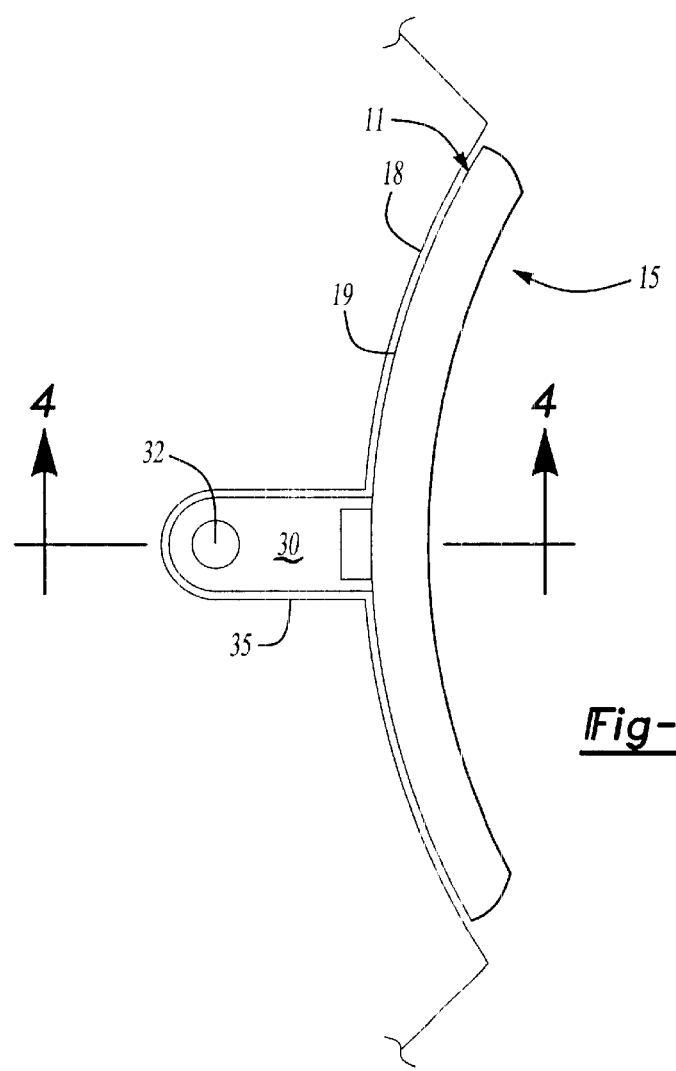
FIG. 3 is an amplified planar view showing detail of the sealing member illustrated FIG. 2 in relation to the gasket.

Uniquely, as further shown in FIGS. 1 and 3, at least one cylinder opening 11 in inner spacer layer 20 is provided with at least one channel 25 cut in spacer layer 20 to aid in the location and retainment of sealing member 15 within cylinder opening 11. Channel 25 extends outwardly from a periphery 18 defined by the circumference of cylinder opening 11. Preferably, two channels 25 are stamped into inner spacer layer 20 to diametrically oppose each other about the circumference of each cylinder opening 11. Although two diametrically opposed channels 25 are preferred, cylinder opening 11 may be provided with additional channels 25 that extend outwardly from periphery 18 of cylinder opening 11 as required by application to retain or locate sealing member 15 within cylinder opening 11.

Corresponding with each channel 25 extending outwards from periphery 18 of cylinder opening 11 are upper and lower retainment bores 27 and 28 provided in surface layers 21 and 22, respectively. Each retainment bores 27 and 28 are located through surface layers 21 and 22 at positions that place bores 27 and 28 in alignment with each other and channel 25 of inner spacer layer 20. Preferably, bores 27 and 28 are oriented about each cylinder opening 11 at corresponding locations in surface layers 21 and 22 so that bores 27 and 28 align with channel 25 and each other towards the distal end of channel 25. Similarly, additional retainment bores 27 and 28 may be placed in surface layers 21 and 22 to provide a set of aligning bores 27 and 28 that correspond to and align with each channel 25 cut into inner spacer layer 20.

Figure 2:
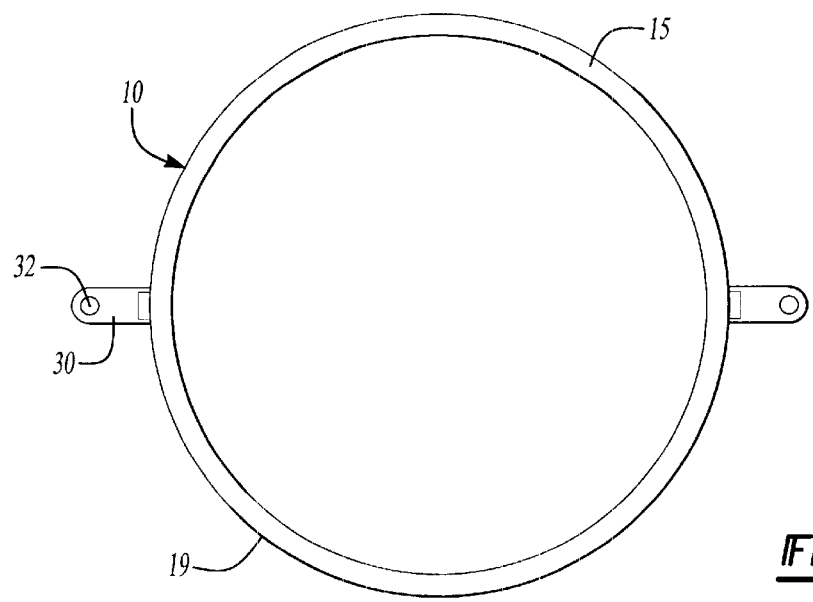
FIG. 2 is a planar view of a sealing member of the sealing assembly and gasket of the present invention.

To correspond with each cylinder opening 11, sealing member 15, having a radially outer circumference, is formed with at least one tab 30 that extends outwardly from a periphery 19 defined by the circumference of sealing member 15. The circumference of sealing member 15 is less than the circumference of cylinder bore 11 to permit sealing member 15 to reside in and float in opening 11. As shown in FIGS. 2 and 3, tab 30 is embossed with a tab bore 32, preferably at its distal end. Tab 30 corresponds with each channel 25. Preferably, as shown in FIG. 2, two tabs 30 diametrically oppose each other about periphery 19 of each sealing member 15. The diametrically opposed tabs 30 correspond with a pair of channels 25 extending from cylinder opening 11 in spacer layer 20. Tab bore 32 corresponds and aligns with the upper and lower retainment bores 27 and 28 of surface layers 21 and 22, respectively.

Figure 4:
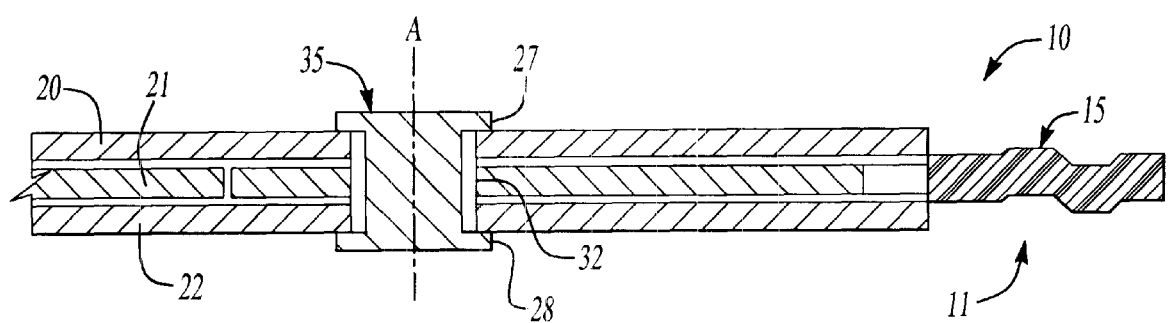
FIG. 4 is a cross-sectional view of a portion of the gasket along lines 4—4 in FIGS. 1 and 3.

As shown in FIGS. 1 and 3, sealing member 15 orients in the cylinder opening with tab 30 residing in channel 25. Upon positioning sealing member 15 in cylinder opening 11 of inner spacer layer 20, each tab 30 is eyeletted with an eyelet 35 between surface layers 21 and 22. As best seen in FIG. 4, eyelet 35 extends through upper retainment bore 27, tab bore 32, and lower retainment bore 28 to lock tabs 30 in channels 25 thereby positively locating sealing member 15 over the cylinder bores of the engine block during installation of gasket 10. Eyelet 35 is preferably made of brass, though other materials known in the art may be used. Alternatively, eyelet 35 may also be a fastener such as a pin, bolt, clip or device designed to join materials. The location of tab 30 in channel 15 in conjunction with eyelet 35 retains the sealing member in the cylinder opening 11. Additionally, eyelet 35 enables sealing member 15 to move upwards and downwards along axis A of eyelet 35 to permit sealing member 15 to float in cylinder opening 11 during operation of the engine independently of spacer layer 20.

Alternatively, sealing member 15 may be positioned and retained in cylinder opening 11 of inner spacer layer 20 through the bonding of tabs 30 residing in channels 15 to surface layers 21 and 20. In this embodiment, bores 27, 28, and 32 are unnecessary, and instead an upper surface of tab 30 is bonded to a bottom surface of upper surface layer 21 and a lower surface of tab 30 is bonded to an upper surface of bottom surface layer 22. The bond used to retain tabs 30 to the upper and lower surface layers 21 and 22 and positioned in channels 15 may be employed through various mechanical or chemical bonding techniques commonly used in the art such as a spot wield or application of an adhesive.

In the engine environment, gasket 10 is clamped into place between the cylinder head and engine block with sealing member 15 residing over the cylinder bore. Because of the high clamping pressure, sealing member 15 provides a very high sealing stress level. Further, because sealing member 15 floats in cylinder opening 11, it moves independent of inner spacer layer 20 to accommodate any slight variations in the adjacent cylinder liner protrusions (not shown) and any variations between the sealing surfaces, resulting in better seal conformability. As gasket 10 is secured between the cylinder head and engine block, sealing member 15 breaks away from gasket 10 to float in cylinder opening 11 with the engine components while in operation. The retainment of sealing member 15 to the upper and lower surface layers 21 and 22 in multi-layer gasket 10 permits the positive location and retainment of sealing member 15 within cylinder opening 11 and over the cylinder bore instead of merely floating a sealing member between space layers 20, 21, and 22, as commonly practiced in the art, which often leads to misalignment of the floating sealing member over the cylinder bore during installation of the gasket.

The design of gasket 10 depends to a large extent upon the specific application being considered, and may be adjusted in various ways. For example, the number of spacer layer, the configuration of the various bores, the dimensions, configuration and orientation of the channels 15 and the selection of materials are all functions of particular engine designs and may be varied accordingly. Likewise, the composition of the sealing member 15 and the dimensions, configuration and orientation of tabs 30 is also a function of engine design. The sealing member 15 and layers 20, 21, and 22 are usually metallic. They can be formed from carbon steel, stainless steel, beryllium-copper alloys, or any other material having the requisite material properties. In general, however, layers 20, 21, and 22 are composed of more rigid material than is sealing member 15.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A cylinder head gasket of an internal combustion engine, the cylinder head gasket comprising:
    an inner spacer layer, said inner spacer member provided with at least one first bore opening from which at least one channel extends outwards from a periphery defined by a circumference of said bore opening;
    an upper surface layer, said upper surface layer provided with at least one second bore opening, which aligns with said first bore opening;

a lower surface layer, said lower surface layer provided with at least one third bore opening, which aligns with said first and second bore opening;

a sealing member provided with at least one tab that extends from a periphery defined by a circumference of said sealing member and that corresponds and is received in said channel to positively locate said sealing member in said first bore opening, said tab connects to said upper and lower surface layers to retain said sealing member in said first bore opening and permit said sealing member to float in said first bore opening.

2. A cylinder head gasket as recited in claim 1, wherein said tab connects to said upper and lower surface layers through an eyelet.

3. A cylinder head gasket as recited in claim 1, wherein said sealing member floats in said bore opening and said channel.

4. A cylinder head gasket as recited in claim 1, wherein said tab is at least two tabs positioned diametrically opposed to each other about the periphery defined by the circumference of said sealing member.

5. A cylinder head gasket as recited in claim 1, wherein said channel is at least two channels positioned diametrically opposed to each other about said periphery.

6. A cylinder head gasket as recited in claim 1, wherein said tab is bonded to said upper and lower surface layers.

7. A cylinder head gasket as recited in claim 1, wherein said tab is embossed and eyeletted with an eyelet to said upper and lower surface layers.

8. A cylinder head gasket as recited in claim 7, wherein said tab is embossed at its distal end.

9. A cylinder head gasket as recited in claim 7, wherein said sealing member is moveable about an axis of said eyelet permitting said sealing member to float in said bore opening.

10. A sealing assembly, comprising:

at least one spacer layer constituting at least part of a gasket to sealingly engage against a mating surface, said mating surface including at least one bore to be sealed and said spacer layer defining at least one opening that corresponds to said bore in said mating surface;

at least one channel extending outwardly from a periphery defined by a circumference of said opening; wherein said spacer layer is sandwiched between at least one upper layer and at least one lower layer;

a sealing member with a circumference less than the said circumference of said opening, said sealing member further including at least one tab extending outwards from a periphery defined by said circumference of said sealing member, said tab received in said channel to positively locate said sealing member in said opening of said spacer layer defining said bore, said tab connects to said upper and lower layers to retain said sealing member in said opening and permit said sealing member to float in said opening.

11. An assembly as further recited in claim 10, wherein said sealing member floats in said opening and said channel.

12. An assembly as further recited in claim 10, wherein said tab is at least two tabs positioned diametrically opposed to each other about said periphery of said sealing member.

13. An assembly as further recited in claim 10, wherein said channel is at least two channels positioned diametrically opposed to each other extending from said periphery of said opening.

14. An assembly as further recited in claim 10, wherein said tab is bonded to said upper and lower layer.

15. An assembly as further recited in claim 10, wherein said tab is embossed and eyeletted with an eyelet to said upper and lower layers.

16. An assembly as further recited in claim 15, wherein said tab is embossed at its distal end.

17. An assembly as further recited in claim 15, wherein said sealing members is moveable about an axis of said eyelet permitting said sealing member to float in said opening.

\* \* \* \* \*